Jan. 22, 1935.  A. A. THOMAS  1,988,924
VEHICLE BUMPER BAR
Filed Nov. 10, 1933
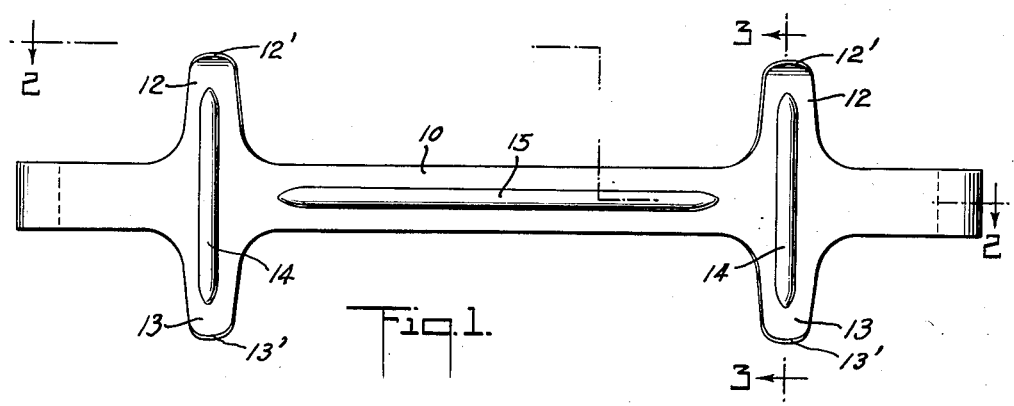
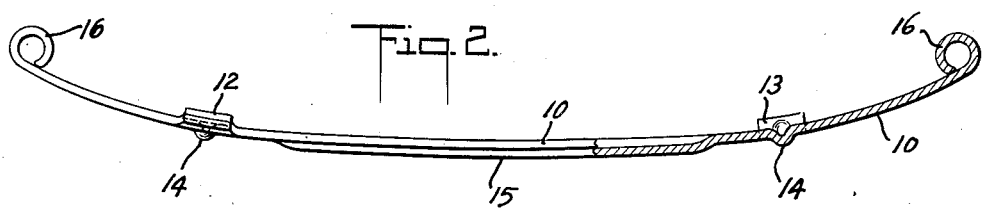
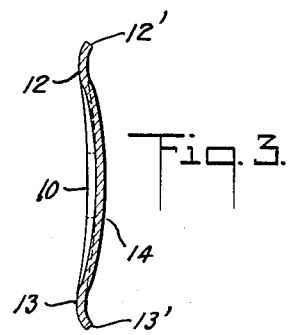
INVENTOR
Adolph A. Thomas Patented Jan. 22, 1935

1,988,924

UNITED STATES PATENT OFFICE 1,988,924

VEHICLE BUMPER BAR

Adolph A. Thomas, New York, N. Y.

Application November 10, 1933, Serial No. 697,376

8 Claims. (Cl. 293—55)

My invention is for a one-piece bumper bar provided with integral guards extending sufficiently above and below the bar to prevent interlocking with the bumpers of other vehicles. In a preferred embodiment of my invention, each pair of upper and lower guard extensions is formed with a vertical strengthening rib which crosses the bumper bar. I usually provide two pairs of guard extensions suitably spaced, and I may form the bumper bar with a longitudinal strengthening rib between the spaced guard extensions.

The novel features and practical advantages of my invention will be understood from a description of the accompanying drawing, in which Fig. 1 is a front view of my new bumper bar;

Fig. 2 is a plan view partly in section on line 2—2 of Fig. 1; and

Fig. 3 is a vertical section on line 3—3 of Fig. 1.

The bumper bar 10, of suitable length and width, is formed with integral upper and lower extensions 12 and 13, which project a sufficient distance above and below the bar to engage the bumpers of other vehicles and thereby prevent interlocking of bumpers. If the bar 10 is a full-length bumper bar for the front or rear end of a motor vehicle, I preferably employ at least two pairs of vertical guard extensions 12—13 suitably spaced. If the bar 10 is part of a rear bumperette, a single pair of extensions 12—13 would be enough.

To prevent the possibility of a stopped bumper slipping over or under the guards 12—13, I may form the latter with forwardly curved tips 12' and 13' respectively, which effectively prevent such accidental overlapping of the engaged bumpers. Also, each pair of vertically aligned extensions 12—13 may be provided with an integral vertical rib 14 for strengthening these extensions against rearward bending when struck by another bumper. However, should another bumper get past the guard extensions 12—13, the forward slope of lip 12' or 13' at the rear will allow withdrawal of the engaged bumper. An integral longitudinal rib 15 may be formed in the bumper bar 10 between the two vertical ribs 14 to reinforce the bar against horizontal impacts.

I have not deemed it necessary to show a complete bumper structure, and it will therefore be understood that the one-piece bar 10 with its integral guards 12—13 is attached to either end of a vehicle in any practical way. By way of example, I have shown the bar 10 terminating in loops 16 adapted to receive bolts or other supporting members. The bar 10 is preferably curved longitudinally, so that it projects forward at the center to increase its resistance to impacts, and it may also be curved slightly across its width, as indicated in Fig. 3. The particular length, width and general shape of the bumper bar 10 will naturally vary for the different styles and sizes of automobiles on which the bar is to be used. In any case, however, the bar 10 and guards 12—13 (with or without the ribs 14 and 15) can be cut and shaped from cold steel in a single operation. The vertical guards 12—13, and the ribs 14 and 15 also serve to enhance considerably the beautiful appearance of the bar as a whole.

While I have shown and described a specific structure, my invention is not limited to the exact details set forth, for changes and modifications are possible within the scope of the appended claims.

I claim as my invention:

1. A one-piece bumper bar provided with at least one pair of integral vertical extensions, which project sufficiently above and below the body of the bar to prevent interlocking with other bumpers, said guard extensions terminating each in a forwardly curved lip to stop an engaged bumper from slipping past the extension, and an integral vertical strengthening rib connecting said extensions.

2. A one-piece bumper bar provided with two pairs of integral transverse extensions projecting sufficiently above and below the body of the bar to prevent interlocking with other bumpers, each pair of upper and lower extensions being vertically aligned and spaced a certain distance from the center of the bar, and an integral vertical strengthening rib connecting each pair of upper and lower extensions.

3. A one-piece bumper bar provided with two pairs of integral transverse extensions projecting sufficiently above and below the body of the bar to prevent interlocking with other bumpers, each extension terminating in a forwardly curved lip to stop an engaged bumper from slipping past the extension, each pair of upper and lower extensions being vertically aligned and spaced a certain distance from the center of the bar, an integral vertical strengthening rib connecting each pair of upper and lower extensions, and an integral longitudinal strengthening rib formed in said bar between said vertical ribs.

4. A substantially flat bumper bar made in one piece and provided with two pairs of integral vertical guards projecting sufficiently above and below the body of the bar to prevent interlocking with other bumpers, and means extending above and below the width of the bar for strengthening said guards.

5. A substantially flat bumper bar made in one piece and provided with two pairs of integral vertical guards projecting sufficiently above and below the body of the bar to prevent interlocking with other bumpers, and an integral horizontal hollow rib in said bar between the two pairs of guards, said rib strengthening the bar.

6. A substantially flat bumper bar made in one piece and provided with two pairs of integral vertical guards projecting sufficiently above and below the body of the bar to prevent interlocking with other bumpers, means extending above and below the width of the bar for strengthening said guards, and an integral horizontal rib in said bar between the two pairs of guards for strengthening the bar.

7. A bumper bar comprising a pair of substantially flat side portions and a central portion, each side portion having a pair of integral vertical guards extending above and below the body of the bar, said central portion having an integral hollow rib for strengthening the bar.

8. A bumper bar comprising a pair of substantially flat side portions and a central portion, each side portion having a pair of integral vertical guards extending above and below the body of the bar, said central portion having an integral hollow rib for strengthening the bar, and means for strengthening said integral guards.

ADOLPH A. THOMAS.